(12) United States Patent
Yim et al.

(10) Patent No.: US 10,469,744 B2
(45) Date of Patent: Nov. 5, 2019

(54) MOBILE TERMINAL AND OPERATING METHOD THEREOF

(71) Applicant: LG ELECTRONICS INC., Seoul (KR)

(72) Inventors: Soyeon Yim, Seoul (KR); Jinhee Lee, Seoul (KR); Yunjueng Mhun, Seoul (KR); Jaeyoung Chae, Seoul (KR); Younghoon Lee, Seoul (KR); Jinwook Kim, Seoul (KR)

(73) Assignee: LG ELECTRONICS INC., Seoul (JP)

( * ) Notice: Subject to any disclaimer, the term of this patent is extended or adjusted under 35 U.S.C. 154(b) by 0 days.

(21) Appl. No.: 15/823,117

(22) Filed: Nov. 27, 2017

(65) Prior Publication Data

US 2018/0152636 A1 May 31, 2018

(30) Foreign Application Priority Data

Nov. 28, 2016 (KR) .................. 10-2016-0159498

(51) Int. Cl.
| | |
|---|---|
| *H04N 5/222* | (2006.01) |
| *H04N 5/232* | (2006.01) |
| *G06T 3/00* | (2006.01) |
| *H04N 5/262* | (2006.01) |
| *G11B 27/031* | (2006.01) |
| *G06T 11/60* | (2006.01) |

(52) U.S. Cl.
CPC ....... *H04N 5/23238* (2013.01); *G06T 3/0062* (2013.01); *G06T 11/60* (2013.01); *G11B 27/031* (2013.01); *H04N 5/23216* (2013.01); *H04N 5/23293* (2013.01); *H04N 5/2628* (2013.01)

(58) Field of Classification Search
CPC .......... H04N 5/23293; H04N 5/23238; H04N 5/232933; G06T 11/60; G06T 2210/22
See application file for complete search history.

(56) References Cited

U.S. PATENT DOCUMENTS

| | | | | |
|---|---|---|---|---|
| 8,736,680 | B1* | 5/2014 | Cilia | H04N 5/247 348/148 |
| 2014/0063181 | A1* | 3/2014 | Lee | G06T 3/0025 348/36 |
| 2017/0230587 | A1* | 8/2017 | Kanai | H04N 5/265 |
| 2017/0256072 | A1* | 9/2017 | Shimmoto | G06K 9/00778 |

(Continued)

OTHER PUBLICATIONS

Author Unknown, "Spherical images are now even more fun and useful! Release of the newly developed image editing app "THETA+" Expanded product line includes new Ricoh THETA accessories such as a water resistant case and increased app functionality!" Ricoh Company, Ltd., Jul. 7, 2015, XP055469295, https://www.ricoh.com/release/2015/pdf/0707 thetaE.pdf, pp. 1-3.

(Continued)

*Primary Examiner* — Kelly L Jerabek
(74) *Attorney, Agent, or Firm* — Birch, Stewart, Kolasch & Birch, LLP

(57) ABSTRACT

A mobile terminal includes: a display unit configured to display an omnidirectional spherical image acquired through an omnidirectional capturing device; and a controller configured to cut out a partial image of the omnidirectional spherical image through a crop handler displayed on the omnidirectional spherical image and display a stitched omnidirectional image by stitching remaining regions of the omnidirectional spherical image.

10 Claims, 15 Drawing Sheets

(56) References Cited

U.S. PATENT DOCUMENTS

| | | | |
|---|---|---|---|
| 2018/0013957 A1* | 1/2018 | Irie | G06F 3/0488 |
| 2018/0025478 A1* | 1/2018 | Lee | G06T 5/50 |
| | | | 382/284 |
| 2018/0048823 A1* | 2/2018 | Kang | G06F 3/167 |
| 2018/0068639 A1* | 3/2018 | Kim | G06F 3/04815 |
| 2018/0098105 A1* | 4/2018 | Morita | H04N 1/00103 |

OTHER PUBLICATIONS

Cheng, "Editing 360 Photos & Injecting Metadata," Facebook, Jun. 8, 2016, XP055469308, https://www.facebook.com/notes/eric-cheng/editing-360-photos-injecting-metadata/10156930564975277/, pp. 1-10.

David, "Getting Around in GIMP—Heal Selection (Resynthesizer)," Aug. 27, 2012, XP055469300, https://patdavid.net/2012/08/getting-around-in-gimp-heal-selection.html, pp. 1-21.

\* cited by examiner

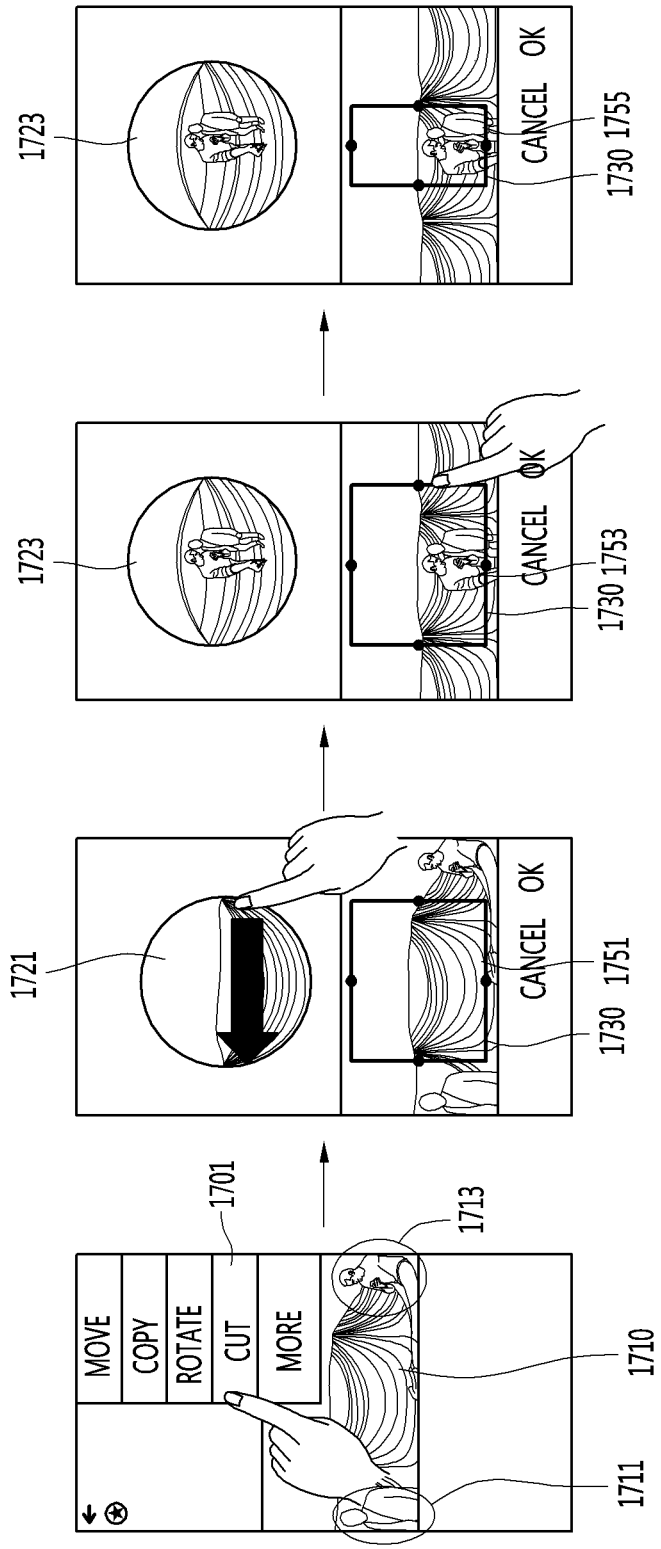

MOBILE TERMINAL AND OPERATING METHOD THEREOF

CROSS-REFERENCE TO RELATED APPLICATIONS

This application claims priority under 35 U.S.C. 119 and 365 to Korean Patent Application No. 10-2016-0159498, filed on Nov. 28, 2016 in the Korean Intellectual Property Office, the disclosure of which is incorporated herein by reference.

BACKGROUND

The present disclosure relates to a mobile terminal and an operating method thereof, and more particularly, to a mobile terminal and an operating method thereof, which are capable of editing omnidirectional content.

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Recently, the mobile terminal has been used so as to interwork with a capturing device capturing an omnidirectional image. A general camera may capture a two-dimensional image, but a 360-degree camera may acquire an omnidirectional spherical image having a spherical shape by photographing a three-dimensional space. The acquired omnidirectional spherical image may be transmitted to the mobile terminal and be displayed on a display.

However, in the past, since an omnidirectional image has been provided only in a circular shape or a panorama shape but a function for editing the omnidirectional image has not been provided, it has been impossible to meet a user's need for acquiring only a desired portion.

SUMMARY

Accordingly, an object of the present disclosure is to address the above-noted and other problems.

Embodiments provide to a mobile terminal and an operating method thereof, which are capable of acquiring only a desired portion by cutting out a portion of an omnidirectional image.

Embodiments also provide a mobile terminal and an operating method thereof, which are capable of rapidly editing an unnecessary portion of an omnidirectional image without a complicated process.

In one embodiment, a mobile terminal: a display unit configured to display an omnidirectional spherical image acquired through an omnidirectional capturing device; and a controller configured to cut out a partial image of the omnidirectional spherical image through a crop handler displayed on the omnidirectional spherical image and display a stitched omnidirectional image by stitching remaining regions of the omnidirectional spherical image.

In various embodiments of the present disclosure, a user may rapidly edit an unnecessary portion of an omnidirectional image without a complicated process.

In addition, in various embodiments of the present disclosure, the user may receive various user experiences for editing an omnidirectional image.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIG. 17 is a diagram illustrating a process of editing an omnidirectional image on a panoramic view screen, according to an embodiment of the present disclosure.

DETAILED DESCRIPTION OF THE EMBODIMENTS

Figure 1A:
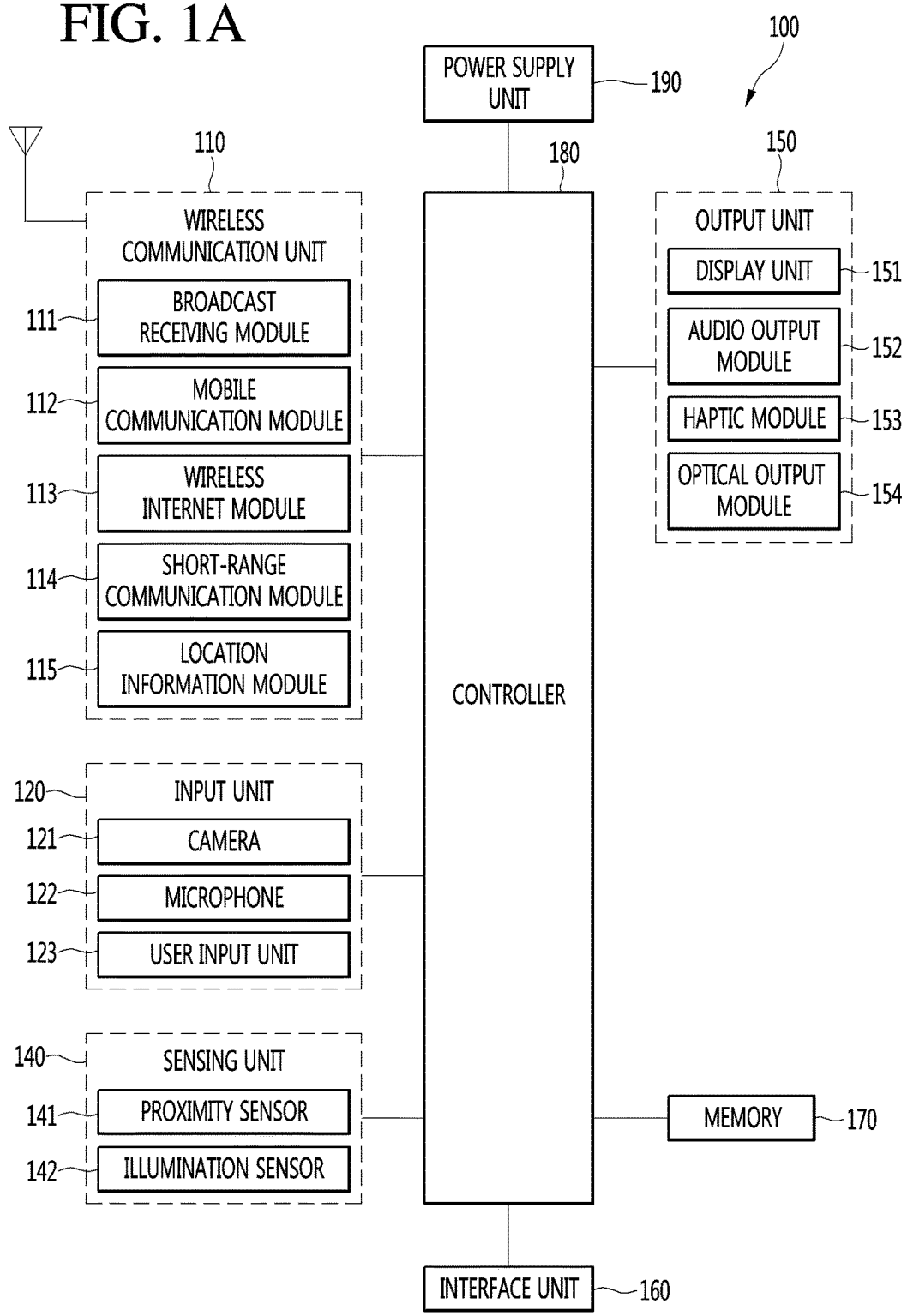
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A to 1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 1B:
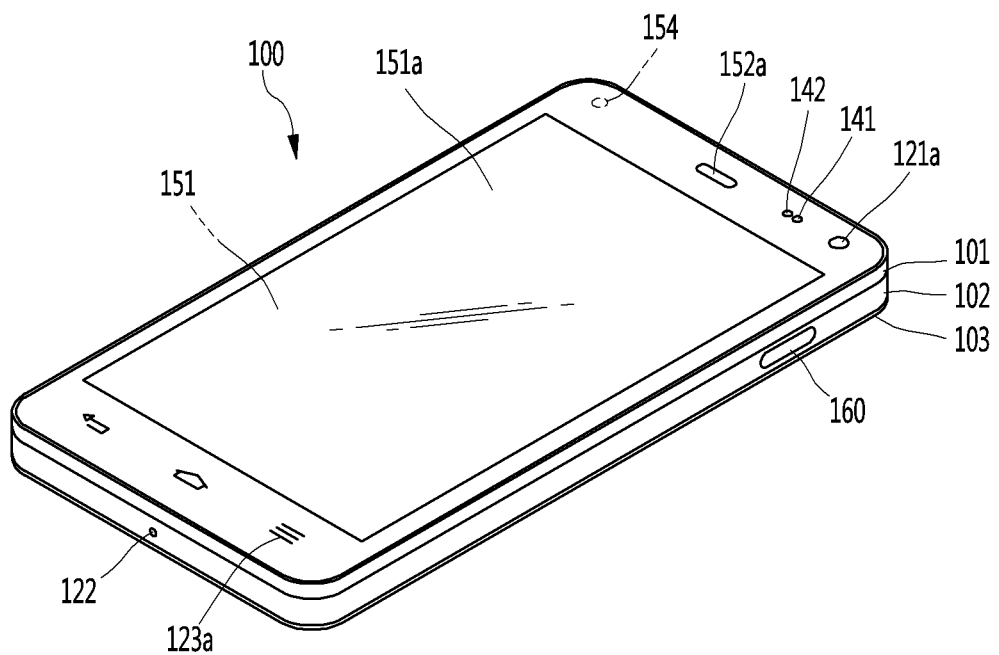
FIGS. 1B and 1C are conceptual views of one example of the mobile terminal, viewed from different directions.
Figure 1C:
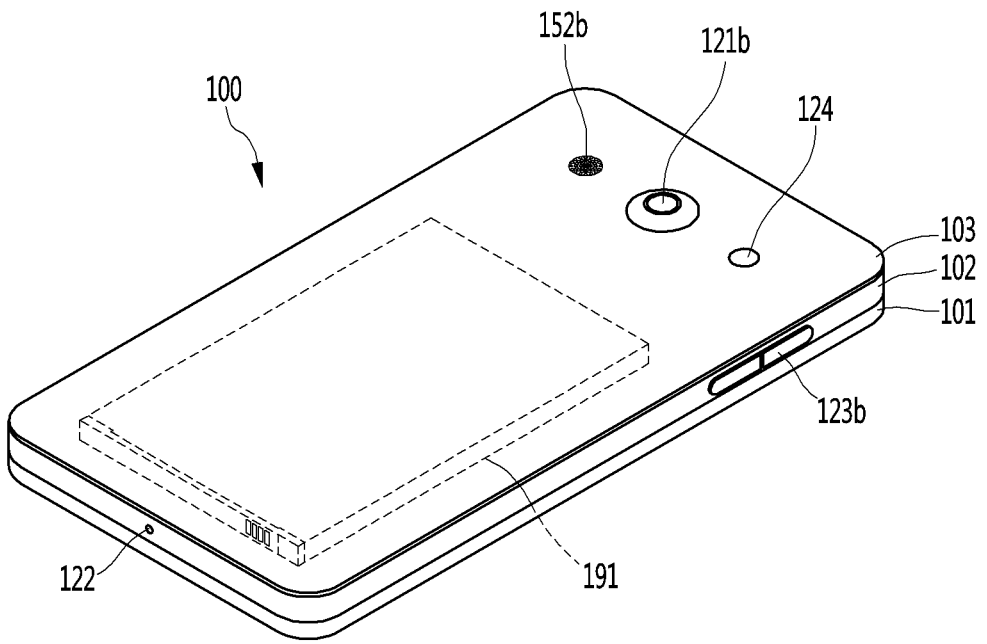

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, first and second audio output modules 151a/151b, a proximity sensor 141, an illumination sensor 142, an optical output module 154, first and second cameras 121a/121b, first and second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 2:
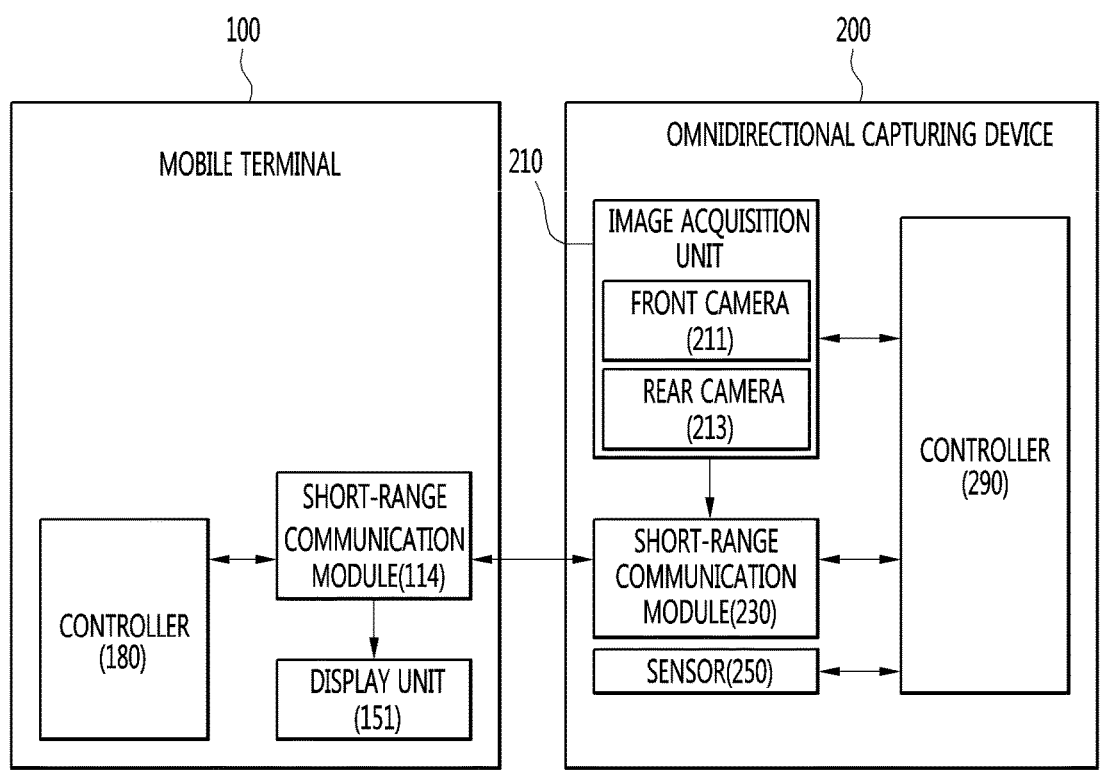
FIG. 2 is a diagram illustrating a configuration of a mobile terminal and an omnidirectional capturing device according to an embodiment of the present disclosure.

FIG. 2 is a diagram illustrating a configuration of a mobile terminal 100 and an omnidirectional capturing device 200 according to an embodiment of the present disclosure.

Only a portion of elements in the mobile terminal 100 shown in FIG. 1 is illustrated in FIG. 2. The descriptions of the configuration in the mobile terminal 100 shown in FIG. 2 are replaced by the descriptions of FIG. 1.

The omnidirectional capturing device 200 may include an image acquisition unit 210, a short-range communication module 230, a sensor 250, and a controller 290.

The image acquisition unit 210 may acquire an omnidirectional image by photographing an omnidirectional background around the omnidirectional capturing device 200.

The omnidirectional image may have a spherical shape of FIG. 3 described later. The omnidirectional image may be called a 360-degree image.

The image acquisition unit 210 may include a plurality of cameras. A front camera 211 and a rear camera 213 are illustrated in an example in FIG. 2, but the present disclosure is not limited thereto. Three or more cameras may be provided in the omnidirectional capturing device 200.

The front camera 211 and the rear camera 213 may each include a fisheye lens having a view angle of 180° or more. The front camera 211 and the rear camera 213 may each photograph the omnidirectional background through the fisheye lens.

The controller 290 may produce an omnidirectional image by mixing two partial omnidirectional images respectively acquired through the fisheye lenses in a spherical shape.

The short-range communication module 230 may wirelessly transmit the omnidirectional image produced by the controller 290 to the mobile terminal 100, the omnidirectional image having the spherical shape. The short-range communication module 230 may transmit the omnidirectional image to the mobile terminal 100 by using any one communication specification of Wi-Fi Direct, Bluetooth, and Wi-Fi, but the communication specification is a mere example.

The omnidirectional capturing device 200 may include a wired communication interface such as a USB interface in addition to the short-range communication module 230 and perform communication with the mobile terminal 100 through the wired communication interface.

The sensor 250 may include at least one of a gyro sensor and an acceleration sensor.

The controller 290 may control an overall operation of the omnidirectional capturing device 200.

In addition, the omnidirectional capturing device 200 may include at least one microphone.

Figure 3:
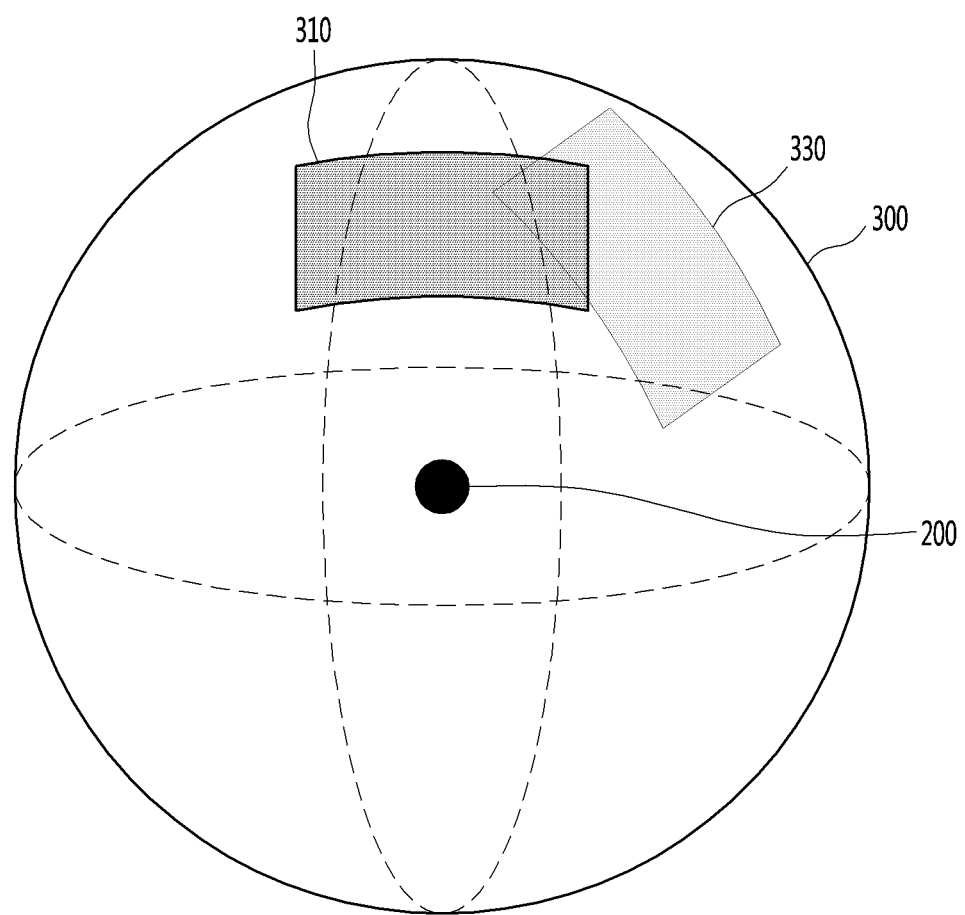
FIG. 3 is a diagram illustrating that an omnidirectional background around an omnidirectional capturing device is capable of being photographed.

FIG. 3 is a diagram illustrating that an omnidirectional background around the omnidirectional capturing device 200 is capable of being photographed.

The omnidirectional capturing device 200 may photograph an omnidirectional background. The omnidirectional capturing device 200 may photograph a vertical lower region and a vertical upper region with respect to a horizontal plane on which the omnidirectional capturing device 200 is placed. That is, the omnidirectional capturing device 200 may acquire an omnidirectional image 300 having a spherical shape and corresponding to the omnidirectional background with respect to the omnidirectional capturing device 200. The acquired omnidirectional image 300 may be transmitted to the mobile terminal 100.

A display unit 151 of the mobile terminal 100 may display a partial image corresponding to a specific region of the omnidirectional image 300. For example, the display unit 151 of the mobile terminal 100 may display a first partial image 310 corresponding to a first region of the omnidirectional image 300 or a second partial image 330 corresponding to a second region thereof.

The partial image displayed by the display unit 151 may be changed according to setting of a user and be set as a default.

Figure 4:
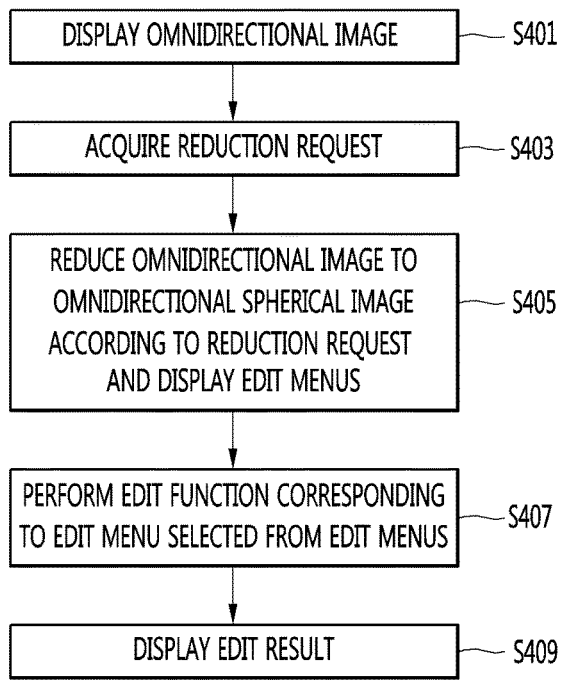
FIG. 4 is a flowchart illustrating an operating method of a mobile terminal, according to an exemplary embodiment of the present disclosure.

FIG. 4 is a flowchart illustrating an operating method of the mobile terminal 100, according to an exemplary embodiment of the present disclosure.

Hereinafter, the operating method of the mobile terminal 100 according to an embodiment of the present disclosure will be described in conjunction with contents of FIGS. 1 to 3.

A controller 180 of the mobile terminal 100 displays an omnidirectional image through the display unit 151 (S401).

In an embodiment, the omnidirectional image displayed on the display unit 151 may be a portion of the omnidirectional image 300 described with reference to FIG. 3.

The controller 180 acquires a reduction request for reducing the displayed omnidirectional image (S403).

In an embodiment, the reduction request may be a pinch-out request. The pinch-out request may be a request for moving inside two touch points in opposite directions.

The controller 180 may reduce the omnidirectional image displayed on a whole screen of the display unit 151 to an omnidirectional spherical image having a preset size in response to the pinch-out request.

The controller 180 reduces the omnidirectional image to the omnidirectional spherical image in response to the pinch-out request and concurrently displays a plurality of edit menus (S405).

In an embodiment, the omnidirectional spherical image may be a portion of the omnidirectional image 300 described with reference to FIG. 3.

In an embodiment, the plurality of edit menus may include a circular crop menu, a pie crop menu, and a view conversion toggle menu.

Each of the plurality of edit menus may be a menu for editing an omnidirectional image. That is, each of the plurality of edit menus may be a menu for acquiring only a desired image by cutting out a portion of an omnidirectional image or a menu for converting a single view into a multi-view or converting the multi-view into the single view.

The circular crop menu may be a menu for cutting out a portion of an omnidirectional image through a circular crop box.

The pie crop menu may be a menu for cutting out a portion of an omnidirectional image through a pie crop box.

The view conversion toggle menu may be a menu for providing an omnidirectional spherical image and a panorama image at the same time or providing the omnidirectional spherical image. The panorama image may represent a planar image in which the omnidirectional spherical image is unfolded.

Each of the plurality of edit menus will be described in detail later.

According to an embodiment of the present disclosure, when the omnidirectional image is converted into an omnidirectional spherical image having a minimum size, the controller 180 may turn off the gyro sensor.

During an edit of the omnidirectional image, when a movement of the mobile terminal 100 is sensed by the gyro sensor, a viewpoint of the omnidirectional spherical image displayed on the display unit 151 may be converted into a viewpoint corresponding to the movement of the mobile terminal 100.

In an embodiment of the present disclosure, when the omnidirectional image is converted into the omnidirectional spherical image having the minimum size, in order for the edit of the omnidirectional image not to be interrupted, a user may turn off the gyro sensor.

The phrase "the gyro sensor is turned off" may indicate that a function of the gyro sensor is disabled.

The controller 180 performs a function corresponding to an edit menu selected from the plurality of edit menus on the omnidirectional spherical image (S407) and displays an edit result (S409).

In an embodiment, when an edit for cutting out a partial image of the omnidirectional image is performed, the controller 180 may display only the remaining images.

The remaining images corresponding to a final edit result may be stored in the memory 170.

Hereinafter, operations S401 and S409 will be described in detail.

FIGS. 5 to 13 are diagrams illustrating an example in which an omnidirectional image is edited through a circular crop menu, according to an embodiment of the present disclosure.

First, FIG. 5 will be described.

Figure 5:
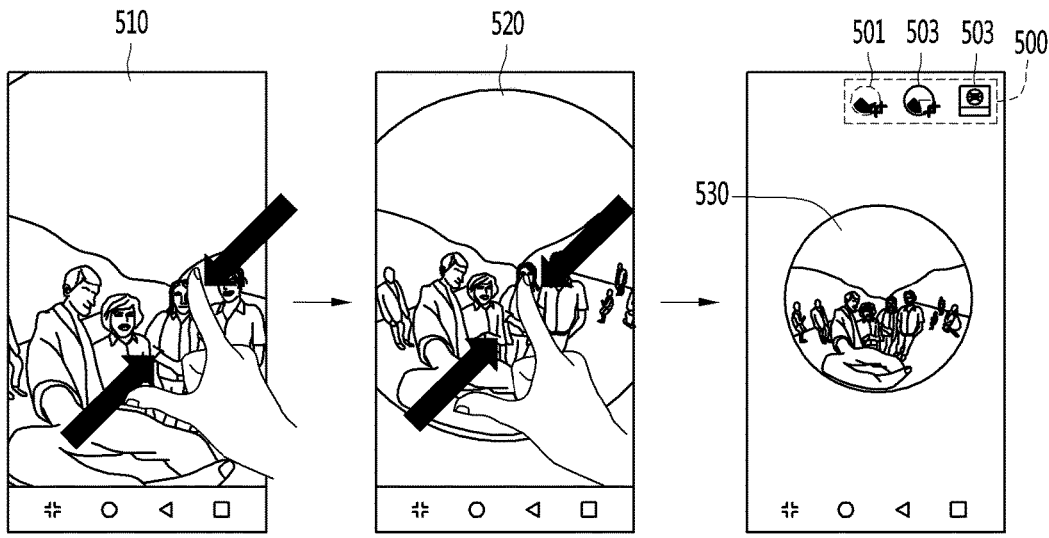
FIGS. 5 to 13 are diagrams illustrating an example in which an omnidirectional image is edited through a circular crop menu, according to an embodiment of the present disclosure.

FIG. 5 is a diagram illustrating an example in which an omnidirectional spherical image having a minimum image and an edit menu list 500 are displayed through a user interface screen according to a reduction request of an omnidirectional image.

Referring to FIG. 5, a partial image 510 of the omnidirectional image is displayed through the display unit 151.

In this state, as a pinch-out request is received, the controller 180 may convert the partial image 510 of the omnidirectional image into an unfinished omnidirectional spherical image 520. The unfinished omnidirectional spherical image 520 may be an image which does not have a complete spherical shape.

if the pinch-out request is received again, the controller 180 may convert the unfinished omnidirectional spherical image 520 into a finished omnidirectional spherical image 530. The finished omnidirectional spherical image 530 may be displayed so as to have a preset size. The preset size may be a size which is reducible to a minimum.

In another embodiment, the controller 180 may directly convert the partial image 510 of the omnidirectional image into the finished omnidirectional spherical image 530 according to the pinch-out request.

On the other hand, the controller 180 may further display the edit menu list 500 while displaying the finished omnidirectional spherical image 530 according to the pinch-out request.

In the past, when the finished omnidirectional spherical image 530 having a preset size has been displayed according to the pinch-out request, a menu for editing an omnidirectional spherical image has not been provided.

In embodiments of the present disclosure, the user may delete an unnecessary portion by providing various menus for editing an omnidirectional spherical image.

The edit menu list 500 may include a circular crop menu 501, a pie crop menu 503, and a view conversion toggle menu 505.

Figure 6:
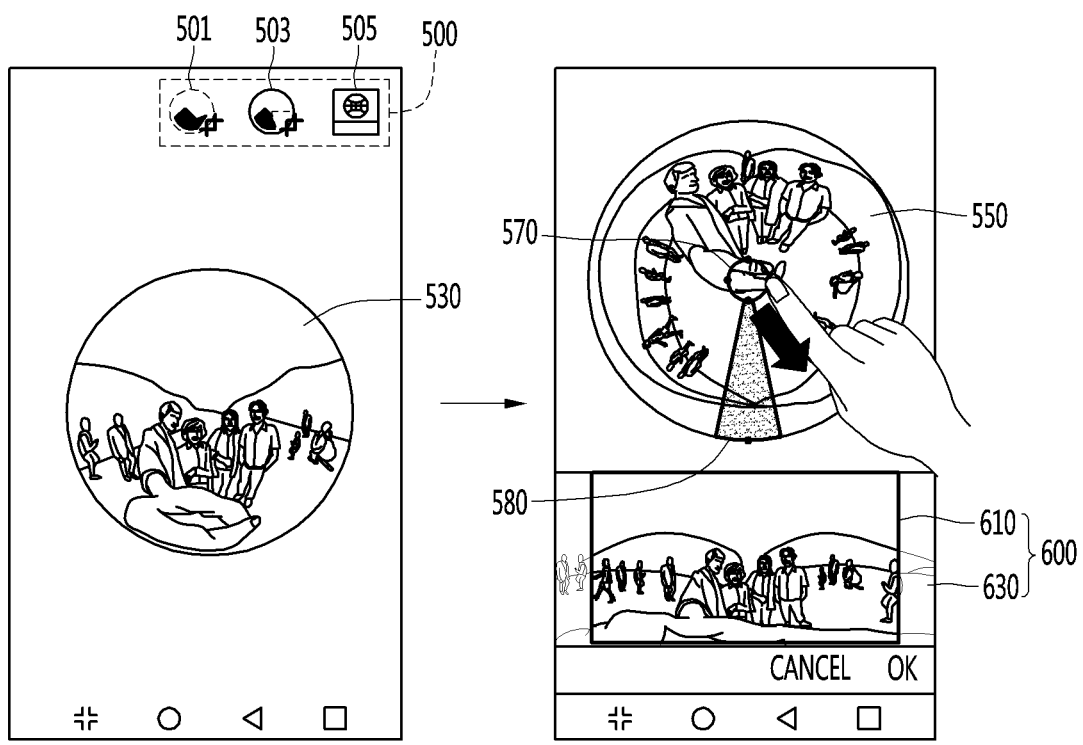

When the circular crop menu 501 is selected, as shown in FIG. 6, the controller 180 may display a circular crop handler 570.

When the circular crop menu 501 is selected, the controller 180 may convert an omnidirectional spherical image 530 corresponding to a first viewpoint into an omnidirectional spherical image 550 corresponding to a second viewpoint while displaying the circular crop handler 570.

This will be described with reference to FIG. 7.

Figure 7:
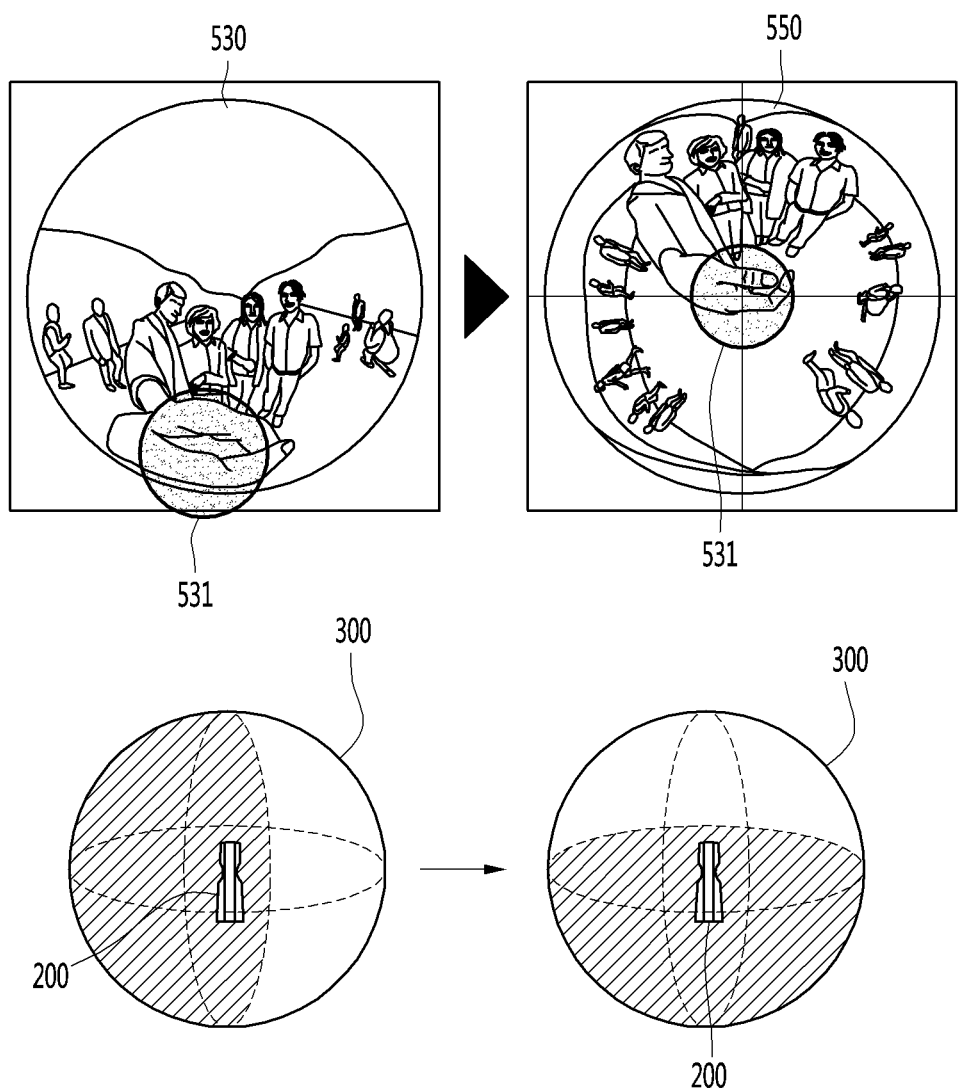

When the circular crop menu 501 is selected, as shown in FIG. 7, the controller 180 may convert the omnidirectional spherical image 530 corresponding to the first viewpoint into the omnidirectional spherical image 550 corresponding to the second viewpoint.

The omnidirectional spherical image 530 corresponding to the first viewpoint may be an image corresponding to a left hemisphere region 701 of a whole image 300 omnidirectionally captured.

The omnidirectional spherical image 550 corresponding to the second viewpoint may be an image corresponding to a lower hemisphere region 703 of the whole image 300 omnidirectionally captured. The second viewpoint may be a viewpoint when viewed from a top placed in a vertical direction with respect to a center of the whole image 300 omnidirectionally captured.

When the circular crop menu 501 is selected, a viewpoint of an omnidirectional spherical image is converted so as to cut out a hand image 531 of the whole image 300, which corresponds to a hand of a user holding the omnidirectional capturing device 200.

That is, as shown in FIG. 7, when the omnidirectional spherical image 550 corresponding to the lower hemisphere region 703 is displayed, the hand image 531 may be placed at a center of the omnidirectional spherical image 550 and the user may more easily cut out the hand image 531.

FIG. 6 will be described again.

The circular crop handler 570 may be displayed on the omnidirectional spherical image 550 corresponding to the second viewpoint. The circular crop handler 570 may be a circular guide for cutting out a portion of the omnidirectional spherical image 550. The circular crop handler 570 may have a circular shape.

A cutting region 580 to be cut out may be differentially displayed on the omnidirectional spherical image 550 according to an operation of the circular crop handler 570. The cutting region 580 may be displayed to be differentiated from the remaining regions of the omnidirectional spherical image 550.

The cutting region 580 may be differentiated from the remaining regions through a separate guide line.

The cutting region 580 may be more darkly displayed compared to the remaining regions of the omnidirectional spherical image 550 in order for the user to intuitionally differentiate a region not to be cut out, from the cutting region 580.

The controller 180 may display a whole planar image 600 on a panoramic view screen while displaying the circular crop handler 570 on the omnidirectional spherical image 550 corresponding to the second viewpoint.

The whole planar image 600 may be displayed at a lower end of the omnidirectional spherical image 550.

The whole planar image 600 may be an image in which a whole spherical image omnidirectionally captured is unfolded on a plane. The whole planar image 600 may be an image obtained by stitching two hemispherical images constituting the whole spherical image.

The whole planar image 600 may include a first planar image 610 corresponding to a region except for the cutting region 580 and a second planar image 630 corresponding to the cutting region 580.

The first planar image 610 may correspond to an image to be acquired and the second planar image 630 may correspond to an image to be cut out.

The first planar image 610 may be displayed so as to be differentiated from the second planar image 630. The second planar image 630 may be more darkly displayed compared to the first planar image 610. The first planar image 610 may be differentiated from the second planar image 630 through a guide line.

On the other hand, a size of the cutting region 580 may be changed through an operation of the circular crop handler 570.

Figure 8:
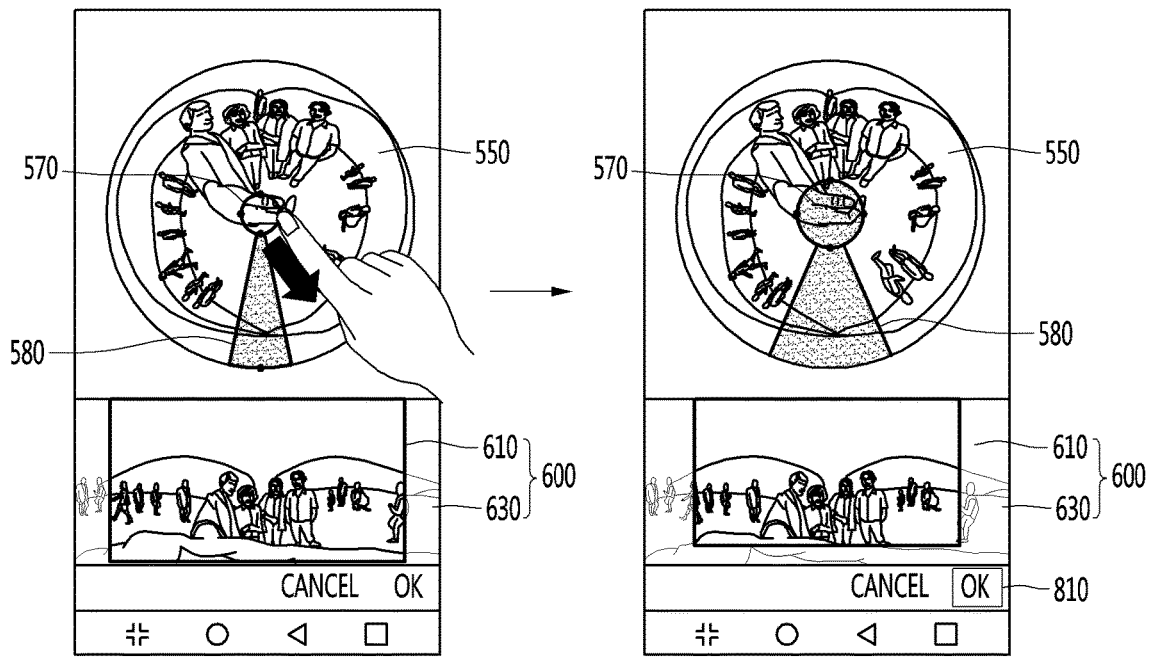
Figure 9:
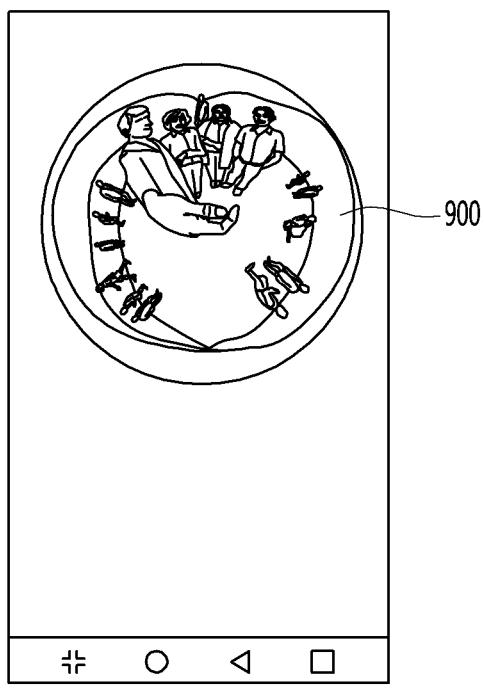

That is, as shown in FIG. 8, as the controller 180 receives a drag input of moving one point of the circular crop handler 570 from the inside to the outside, the controller 180 may increase a size of the cutting region 580. Therefore, a size of the circular crop handler 570 may also be increased.

At the same time, the controller 180 may increase a size of the region to be cut out, through a panoramic view. That is, as shown in FIG. 8, as the size of the cutting region 580 is increased, a size of the second planar image 630 corresponding to the cutting region 580 may be increased. On the contrary, a size of the first planar image 610 not to be cut out may be decreased.

The user may confirm the region to be cut out and the region not to be cut out in real time, through a planar image having a panoramic view shape.

In another embodiment, the controller 180 may adjust the size of the cutting region 580 according to a touch input of moving an outline formed by the circular crop handler 570 from one point to the other point.

For example, the size of the cutting region 580 may be increased according to a touch input of turning the outline of the circular crop handler 570 clockwise.

On the contrary, the size of the cutting region 580 may be decreased according to a touch input of turning the outline of the circular crop handler 570 counterclockwise.

On the other hand, when an OK button 810 shown in FIG. 8 is selected, the controller 180 may display an omnidirectional spherical image 900 in which the second planar image 630 is cut out.

The controller 180 may acquire a final product, i.e., the omnidirectional spherical image 900 by stitching one end and the other end of the first planar image 610 except for the cut-out second planar image 630.

Therefore, the user may easily cut out an unnecessary portion, i.e., a hand portion of the user from an omnidirectional image.

On the other hand, according to another embodiment of the present disclosure, an edit function through the circular crop menu 750 may include a function capable of moving the cutting region 580.

Figure 10:
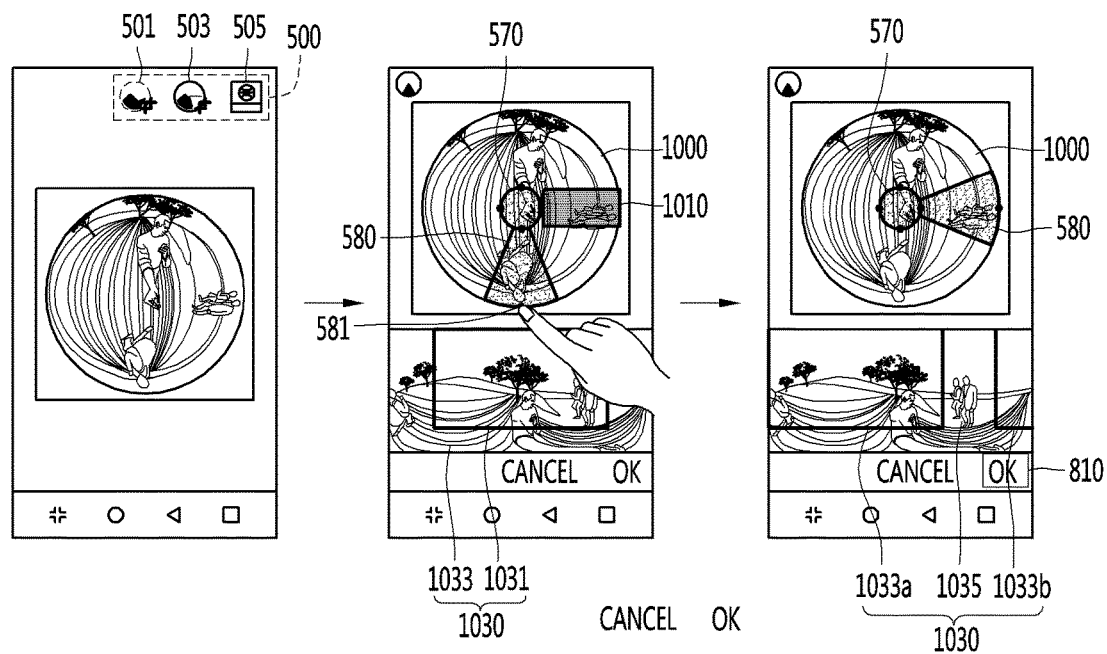

Referring to FIG. 10, an omnidirectional spherical image 1000, which is reduced to a preset minimum size, is illustrated.

The user is to delete a meaningless region 1010 included in the omnidirectional spherical image 1000.

if the circular crop menu 501 is selected, the controller 180 may display the circular crop handler 570 and a cutting region 580 on the omnidirectional spherical image 1000.

In addition, the controller 180 may further display a whole planar image 1030 corresponding to the omnidirectional spherical image 1000 in a panoramic view shape at a lower end of the omnidirectional spherical image 1000.

The whole planar image 1030 may include a first planar image 1031 corresponding to a region not to be cut out and a second planar image 1033 corresponding to the cutting region 580.

When one point 581 of the cutting region 580 is selected and an input of moving the selected one point 581 to the meaningless region 1010 is received, the controller 180 may move the cutting region 580 to a position of the meaningless region 1010.

The one point 581 of the cutting region 580 may be placed on an outline of the cutting region 580 and be differentially displayed in a diamond shape.

When the cutting region 580 is moved to the position of the meaningless region 1010, the controller 180 may display a region 1035 to be cut out and regions 1033*a* and 1033*b* not to be cut out on the whole planar image 1030 so as to be differentiated from each other.

The user may rapidly delete the meaningless region 1010 to be deleted by moving the cutting region 580. In addition, the user may confirm through a panoramic view in real time that the meaningless region 1010 is placed at any location on the whole planar image 1030.

Meanwhile, the cutting region 580 may be called a stitching region. This is because when the cutting region 580 is cut out, it is necessary to display the omnidirectional spherical image 1000 as a natural image by stitching the remaining regions thereof.

When the OK button 810 is selected, the controller 180 may display and store the omnidirectional spherical image 900 in which a portion corresponding to the cutting region 580 is cut out.

On the other hand, according to another embodiment of the present disclosure, the cutting region 580 through the circular crop menu 501 may be optionally toggled in one or plural.

Figure 11:
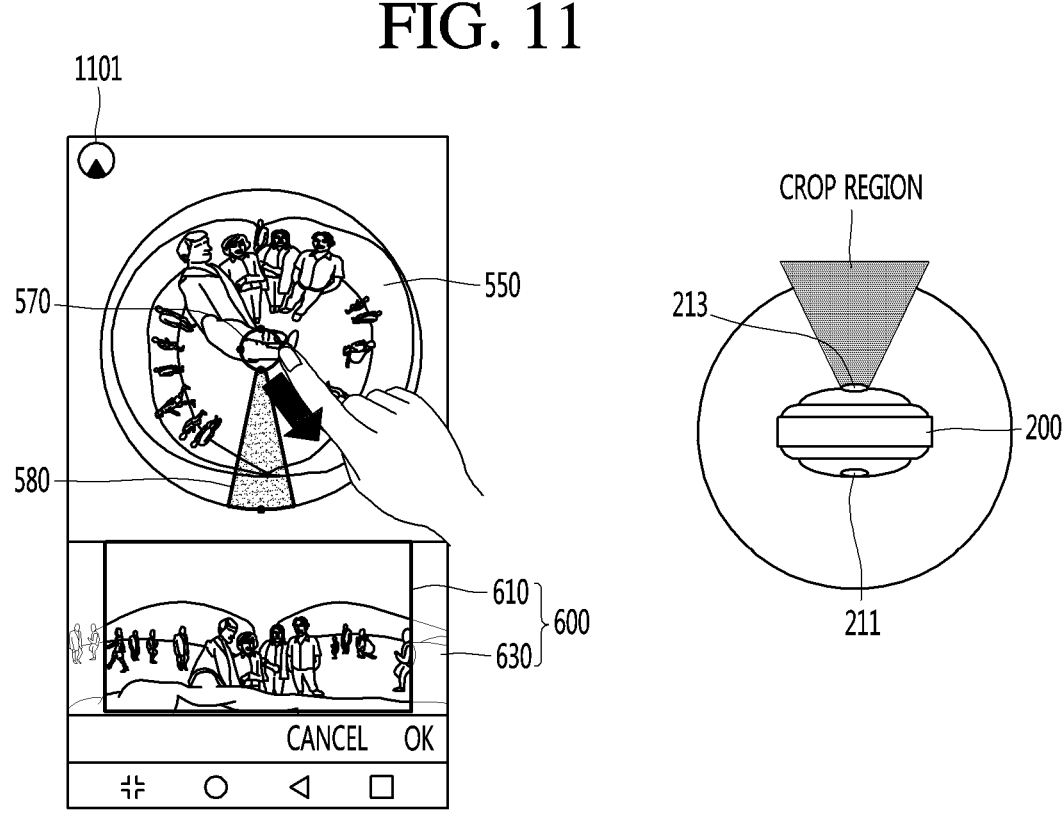
Figure 12:
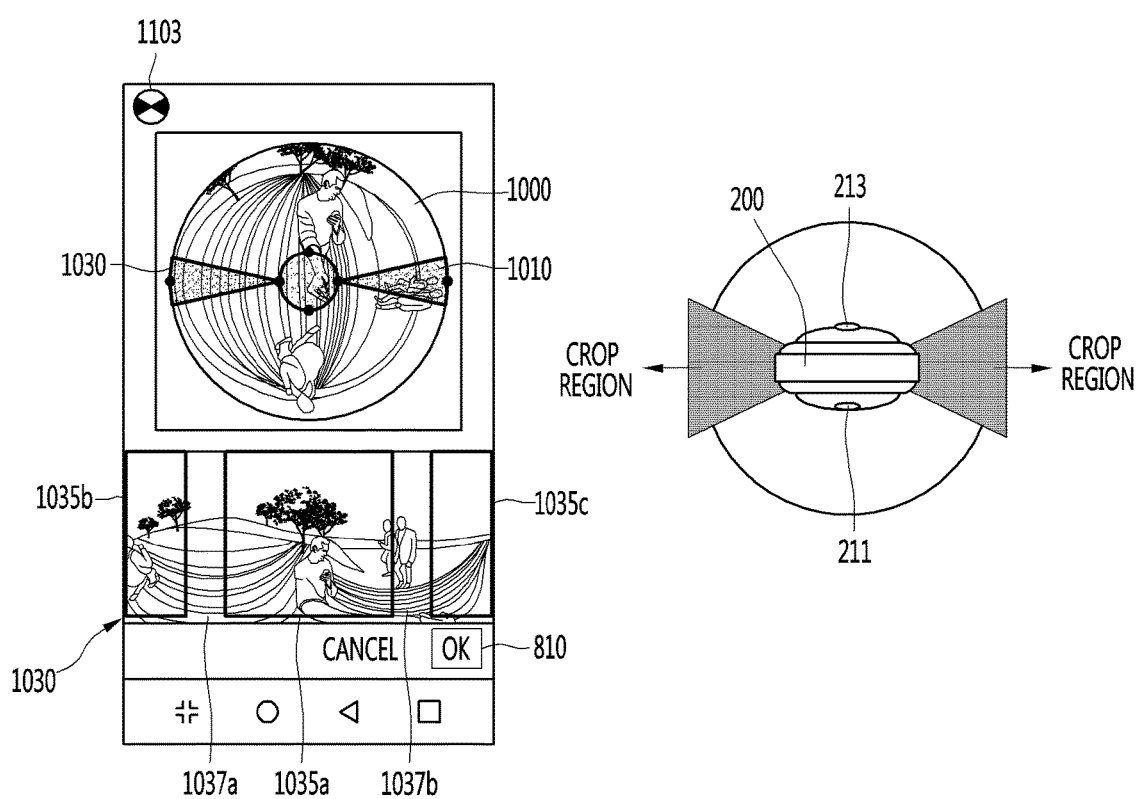
Figure 13:
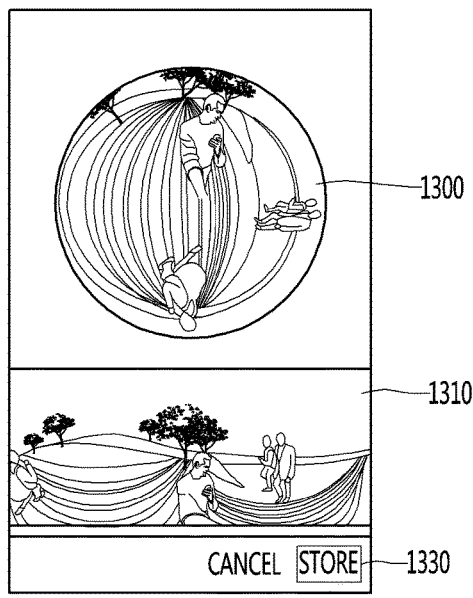

FIGS. 11 to 13 are diagrams illustrating that a cutting region through the circular crop menu 501 is capable of being toggled in one or plural, according to an embodiment of the present disclosure.

The same description as in FIG. 6 will be omitted in FIG. 11.

Referring to FIG. 11, when the circular crop menu 501 is selected, the controller 180 may further display a first crop toggle button 1101.

The first crop toggle button 1101 may be a button for cutting out one rear photographed region faced by the rear camera 213 provided in the omnidirectional capturing device 200.

The one rear photographed region may be a preset region.

The first crop toggle button 1101 may be a button set as a default. That is, when the circular crop menu 501 is selected, the first crop toggle button 1101 may be displayed. Accordingly, one cutting region 580 may be displayed on an omnidirectional spherical image 550.

Generally, a rear side (faced by the rear camera 213) of the omnidirectional capturing device 200 may not be a portion to be photographed by the user. According to an embodiment of the present disclosure, an omnidirectional image may be rapidly edited by automatically providing a cutting region corresponding to a photographed region of the rear camera 213 through the first crop toggle button 1101.

When a request for selecting the first crop toggle button 1101 is received, the controller 180 may display a second crop toggle button 1103. When the second crop toggle button 1103 is selected again, the second crop toggle button 1103 may be converted into the first crop toggle button 1101.

In an embodiment of the present disclosure, descriptions have been provided by exemplifying only two crop toggle button 1101 and 1103, but theses are mere examples. More crop toggle buttons may be present.

Referring to FIG. 12, the second crop toggle button 1103 is displayed. The second crop toggle button 1103 may be a button for cutting out two photographed regions including a left photographed region and a right photographed region of the omnidirectional capturing device 200.

The left photographed region and the right photographed region may be respectively preset regions which are not faced by the front camera 211 and the rear camera 213.

That is, as the second crop toggle button 1103 is selected, a first cutting region 1010 and a second cutting region 1030 may be displayed on an omnidirectional spherical image 1000. The first cutting region 1010 may correspond to the right photographed region of the omnidirectional capturing device 200 and the second cutting region 1030 may correspond to the left photographed region of the omnidirectional capturing device 200.

The first cutting region 1010 and the second cutting region 1030 may be a meaningless region not to be photographed by the user.

A planar image 1037*a* corresponding to the first cutting region 1010 and a planar image 1037*b* corresponding to the second cutting region 1030 are shown at a lower end of the omnidirectional spherical image 1000.

Generally, a left side and a right side of the omnidirectional capturing device 200 may not be a portion to be photographed by the user. According to an embodiment of the present disclosure, an omnidirectional image may be rapidly edited by automatically providing two cutting regions through the second crop toggle button 1103.

That is, the remaining planar images 1035*a* to 1035*c* may be stitched and edited into one planar image later except for the planar images 1037*a* and 1037*b* to be cut out.

When the OK button 810 shown in FIG. 12 is selected, as shown in FIG. 13, the controller 180 may display an omnidirectional spherical image 1300 and a planar image 1310, in which the first cutting region 1010 and the second cutting region 1030 are cut out.

When a store button 1330 is selected, the controller 180 may store the edited omnidirectional spherical image 1300 and the edited planar image 1310 in the memory 170.

Meanwhile, a position of each of the first cutting region 1010 and the second cutting region 1030 may also be changed as shown in FIG. 10.

According to another embodiment of the present disclosure, an omnidirectional image may also be edited through the circular crop menu 501.

Figure 14:
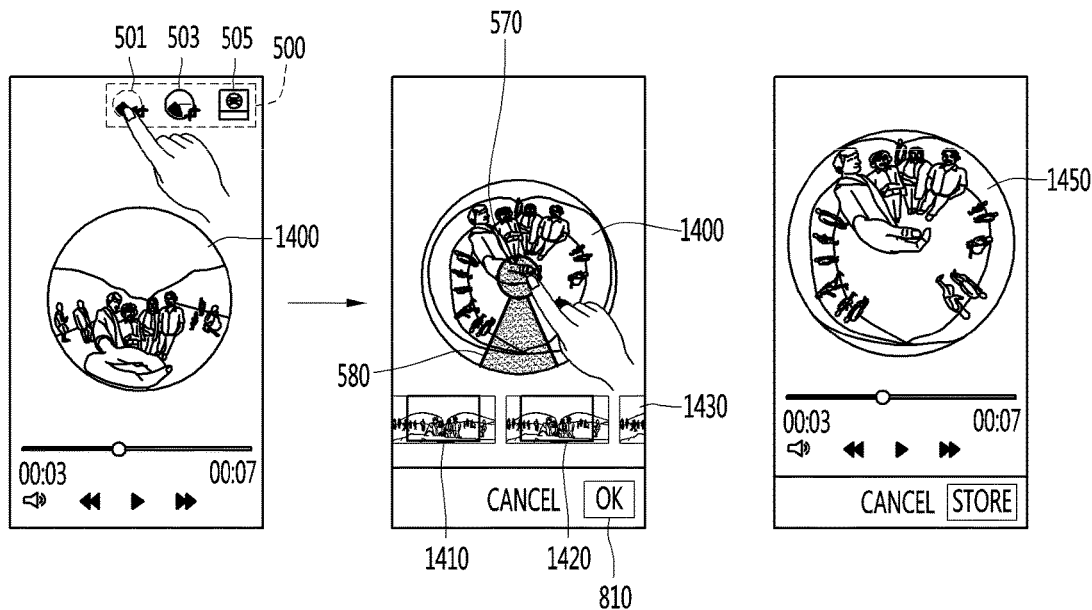
FIG. 14 is a diagram illustrating an example in which an omnidirectional video is edited through a circular crop menu, according to an embodiment of the present disclosure.

FIG. 14 is a diagram illustrating an example in which an omnidirectional video is edited through the circular crop menu 501, according to an embodiment of the present disclosure.

Referring to FIG. 14, when a playback of an omnidirectional video is stopped during the playback thereof, an omnidirectional spherical image 1400 and an edit menu list 500, which correspond to a playback stop time, may be displayed.

When the circular crop menu 501 of the edit menu list 500 is selected, the controller 180 may display the circular crop handler 570 and a cutting region 580 on the omnidirectional spherical image 1400.

In addition, an embodiment of a viewpoint conversion described with reference to FIG. 7 may also be applied in FIG. 14.

When the cutting region 580 is determined through an operation of the circular crop handler 570 (that is, when the OK button 810 is selected), the controller 180 may cut out a partial image corresponding to the cutting region 580.

In addition, the controller 180 may cut out a partial image corresponding to the cutting region 580 with respect to each of all image frames constituting an omnidirectional spherical video.

That is, when the omnidirectional spherical image 1400 corresponds to a first image frame 1420, a partial image corresponding to the same cutting region 580 may also be cut out with respect to each of a second image frame 1410 before one second and a third image frame 1430 after one second.

After the controller 180 cuts out the partial image corresponding to the cutting region 580, the controller 180 may display a final omnidirectional spherical image 1450 completed through a stitching process.

Next, an example in which an omnidirectional image is edited though a pie crop menu 503 included in the edit menu list 500 will be described.

Figure 15:
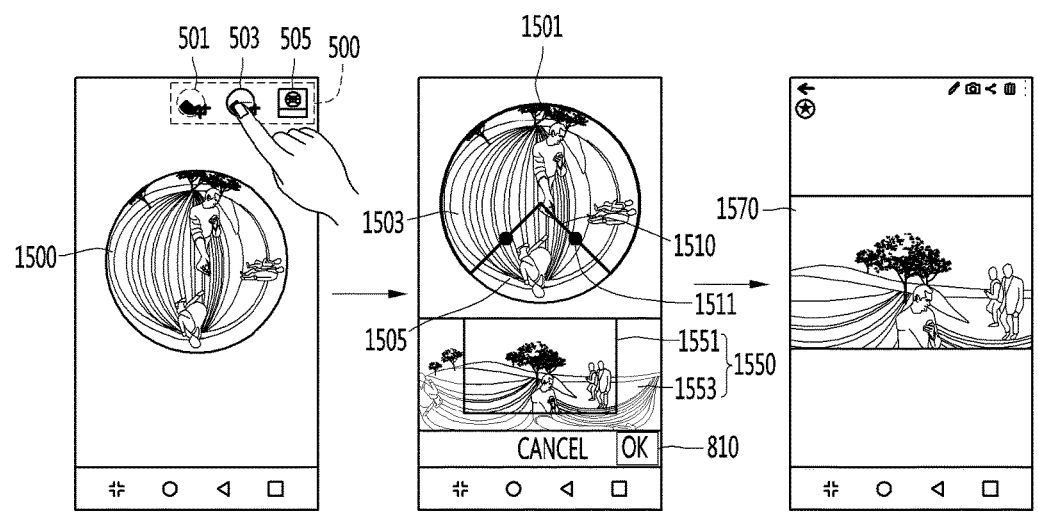
FIG. 15 is a diagram illustrating an example in which an omnidirectional image is edited through a pie crop menu, according to an embodiment of the present disclosure.

FIG. 15 is a diagram illustrating an example in which an omnidirectional image is edited through the pie crop menu 503, according to an embodiment of the present disclosure.

The pie crop menu 503 is useful for editing an omnidirectional image when the omnidirectional image is acquired in a state in which the omnidirectional capturing device 200 is placed at a specific position.

Referring to FIG. 15, an omnidirectional spherical image 1500 having a preset minimum size is illustrated.

When the pie crop menu 503 is selected, the controller 180 may convert the omnidirectional spherical image 1500 corresponding to a first viewpoint into an omnidirectional spherical image 1501 corresponding to a second viewpoint.

The omnidirectional spherical image 1501 corresponding to the second viewpoint may be an image corresponding to a lower hemisphere region of a whole image 300 omnidirectionally captured. The second viewpoint may be a viewpoint when viewed from a top placed in a vertical direction with respect to a center of the whole image 300 omnidirectionally captured. This is the same as described with reference to FIG. 7.

When the pie crop menu 503 is selected, the controller 180 may display a pie crop handler 1510 on the omnidirectional spherical image 1501.

The pie crop handler 1510 may be a Pi-shaped guide for cutting out a partial image of the omnidirectional spherical image 1501.

The omnidirectional spherical image 1501 may be divided into a crop region 1503 not to be cut out and a cutting region 1505 to be cut out by the pie crop handler 1510.

A size of the crop region 1503 may be adjusted through an operation of the pie crop handler 1510.

A size adjustment point 1511 having a diamond shape may be displayed on the pie crop handler 1510 so as to adjust the size of the crop region 1530. When the size adjustment point 1511 is selected, and then, is moved in one direction, the size of the crop region 1503 may be further increased or decreased.

On the other hand, a whole planar image 1550 having a panoramic view shape may be displayed at a lower end of the omnidirectional spherical image 1501.

The whole planar image 1550 may include a first planar image 1551 corresponding to the crop region 1503 and a second planar image 1553 corresponding to the cutting region 1505.

The first planar image 1551 to be cropped may be displayed so as to be differentiated from the second planar image 1553 not to be cropped. For example, brightness of the first planar image 1551 may be brighter than that of the second planar image 1553.

In another example, the first planar image 1551 may be displayed so as to be differentiated from the second planar image 1553 through an outline surrounding the first planar image 1551.

As the size of the crop region 1503 is adjusted, the controller 180 may adjust a size of the first planar image 1551 and a size of the second planar image 1553.

The user may set the crop region 1503 of the omnidirectional spherical image 1501 through an operation of the pie crop handler 1510 and confirm the first planar image 1551 corresponding to the crop region 1503 in real time.

On the other hand, when the OK button 810 is selected, the controller 180 may display a final planar image 1570 corresponding to the crop region 1503.

Next, an example in which an omnidirectional image is edited though a view conversion toggle menu 505 included in the edit menu list 500 will be described.

Figure 16:
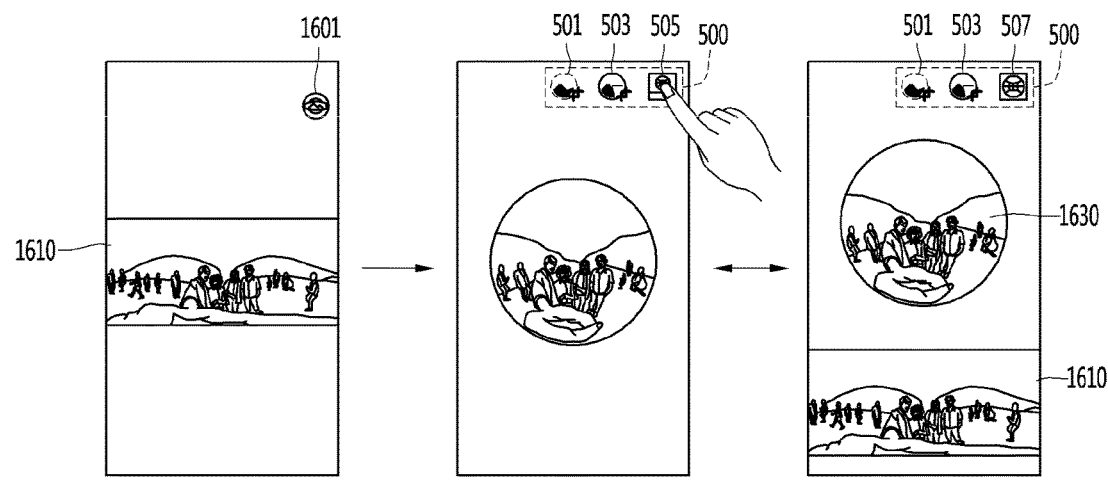
FIG. 16 is a diagram illustrating an example in which an omnidirectional image is provided in various views through a view conversion toggle menu, according to an embodiment of the present disclosure.

FIG. 16 is a diagram illustrating an example in which an omnidirectional image is provided in various views through the view conversion toggle menu 505, according to an embodiment of the present disclosure.

Referring to FIG. 16, the display unit 151 displays a planar image 1610 corresponding to an omnidirectional image.

The display unit 151 may further display a 360-degree view icon 1601 for converting a mode into a 360-degree view mode. The 360-degree view mode may be a mode for displaying an omnidirectional image in a spherical shape.

When the 360-degree view icon 1601 is selected, the controller 180 may convert the planar image 1610 into an omnidirectional spherical image 1630 having a preset minimum size.

At the same time, the controller 180 may further display the edit menu list 500. When the view conversion toggle menu 505 included in the edit menu list 505 is selected, the controller 180 may display the omnidirectional spherical image 1630 and the planar image 1610 together.

In addition, the controller 180 may convert the view conversion toggle menu 505 on the edit menu list 500 into a multi-view conversion toggle menu 507 indicating a multi-view.

In the past, when the 360-degree view mode has been executed, the planar image 1610 has been converted into the omnidirectional spherical image 1630, and when the 360-degree view mode is ended, only the planar image 1610 has been displayed again.

However, in embodiments of the present disclosure, the user may view an omnidirectional image in various shapes by providing the planar image 1610 and the omnidirectional spherical image 1630 together.

In addition, the user may easily delete an unnecessary portion on an omnidirectional image through a multi-view.

On the other hand, when the multi-view conversion toggle menu 507 is selected, the controller 180 may convert the multi-view conversion toggle menu 507 into the previous view conversion toggle menu 505. Since the view conversion toggle menu 505 provides any one of an omnidirectional spherical image and a whole planar image, the view conversion toggle menu 505 may be called a single view conversion toggle menu.

Furthermore, in FIGS. 14 and 15, the multi-view toggle menu 507 may be in a state of being enabled in embodiments in which an omnidirectional spherical image and a planar image are displayed at the same time.

In an embodiment in which only one of the omnidirectional spherical image and the planar image is displayed, the view conversion toggle menu 505 may be in a state of being enabled.

According to another embodiment of the present disclosure, an omnidirectional image may be edited even on a panoramic view screen.

FIG. 17 is a diagram illustrating a process of editing an omnidirectional image on a panorama view screen, according to an embodiment of the present disclosure.

Referring to FIG. 17, the display unit 151 displays a planar image 1710 on a panoramic view screen.

The planar image 1710 may include a first partial image 1711 and a second partial image 1713 acquired by the rear camera of the omnidirectional capturing device 200.

In particular, it is assumed that the first partial image 1711 and the second partial image 1713 are an image including a main subject.

The first partial image 1711 is placed at a left end on the planar image 1710 and the second partial image 1713 is placed at a right end thereon.

In this sate, when a cutting menu 1701 is selected, the controller 180 may display a crop box 1730 while displaying an omnidirectional spherical image 1721.

The crop box 1730 may be a box for cutting out only a portion to be acquired on the omnidirectional spherical image 1721 by the user.

The planar image 1751 in the current crop box 1730 is not a portion desired by the user.

In this state, when an input of dragging the omnidirectional spherical image 1721 leftwardly is received, the controller 180 may display an omnidirectional spherical image 1723 at a different viewpoint.

At the same time, the previous planar image 1751 may be converted into a planar image 1753 corresponding to the omnidirectional spherical image 1723. In this process, the controller 180 may perform an automatic stitching operation so as to provide the planar image 1753.

A main subject to be acquired by the user may be placed in the crop box 1730 according to a drag input.

The controller 180 may decrease a size of the crop box 1730 according to an input of decreasing the size of the crop box 1730. Therefore, only a reduced planar image 1755 in the crop box 1730 may be acquired.

As described above, according to an embodiment of the present disclosure, only an appropriate portion of an omnidirectional image may be acquired on a panoramic view screen through an omnidirectional spherical image without a complicated process.

The present disclosure mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a gyro sensor;

a display unit configured to display an omnidirectional spherical image; and a controller configured to:

cut out a partial image of the omnidirectional spherical image through a crop handler displayed on the omnidirectional spherical image, and display a stitched omnidirectional image by stitching remaining regions of the omnidirectional spherical image, wherein the gyro sensor is disabled if the omnidirectional spherical image is reduced to a preset size for editing the omnidirectional spherical image.

2. The mobile terminal of claim 1, wherein the omnidirectional spherical image is divided into a first region to be cut out through the crop handler and a second region not to be cut out.

3. The mobile terminal of claim 2, wherein, when a size of the first region or a second region is changed, a size of each of a first planar image corresponding to the first region and a second planar image corresponding to the second region is changed according to the changed size.

4. The mobile terminal of claim 2, wherein the first region is a region corresponding to a portion of an image acquired through a rear camera or a front camera and the rear camera provided in an omnidirectional capturing camera, or a region which is not faced by the front camera and the rear camera.

5. The mobile terminal of claim 4, wherein the first region is provided with two regions, and wherein the two regions are not respectively faced by the front camera and the rear camera.

6. The mobile terminal of claim 1, wherein the crop handler is any one of a circular crop handler having a circular shape and a pie crop handler having a pie shape.

7. An operating method of a mobile terminal including a gyro sensor, the operating method comprising:

displaying an omnidirectional spherical image;

cutting out a partial image of the omnidirectional spherical image through a crop handler displayed on the omnidirectional spherical image;

stitching remaining images except for the cut-out partial image; and displaying a stitched omnidirectional image by stitching remaining regions of the omnidirectional spherical image, wherein the gyro sensor is disabled if the omnidirectional spherical image is reduced to a preset size for editing the omnidirectional spherical image.

8. The operating method of claim 7, wherein the omnidirectional spherical image is divided into a first region to be cut out through the crop handler and a second region not to be cut out.

9. The operating method of claim 8, when a size of the first region or the second region is changed, a size of each of a first planar image corresponding to the first region and a second planar image corresponding to the second region is changed according to the changed size.

10. The operating method of claim 8, wherein the first region is a region corresponding to a portion of an image acquired through a rear camera or a front camera and the rear camera provided in an omnidirectional capturing camera, or a region which is not faced by the front camera and the rear camera.

* * * * *